Figure 1:
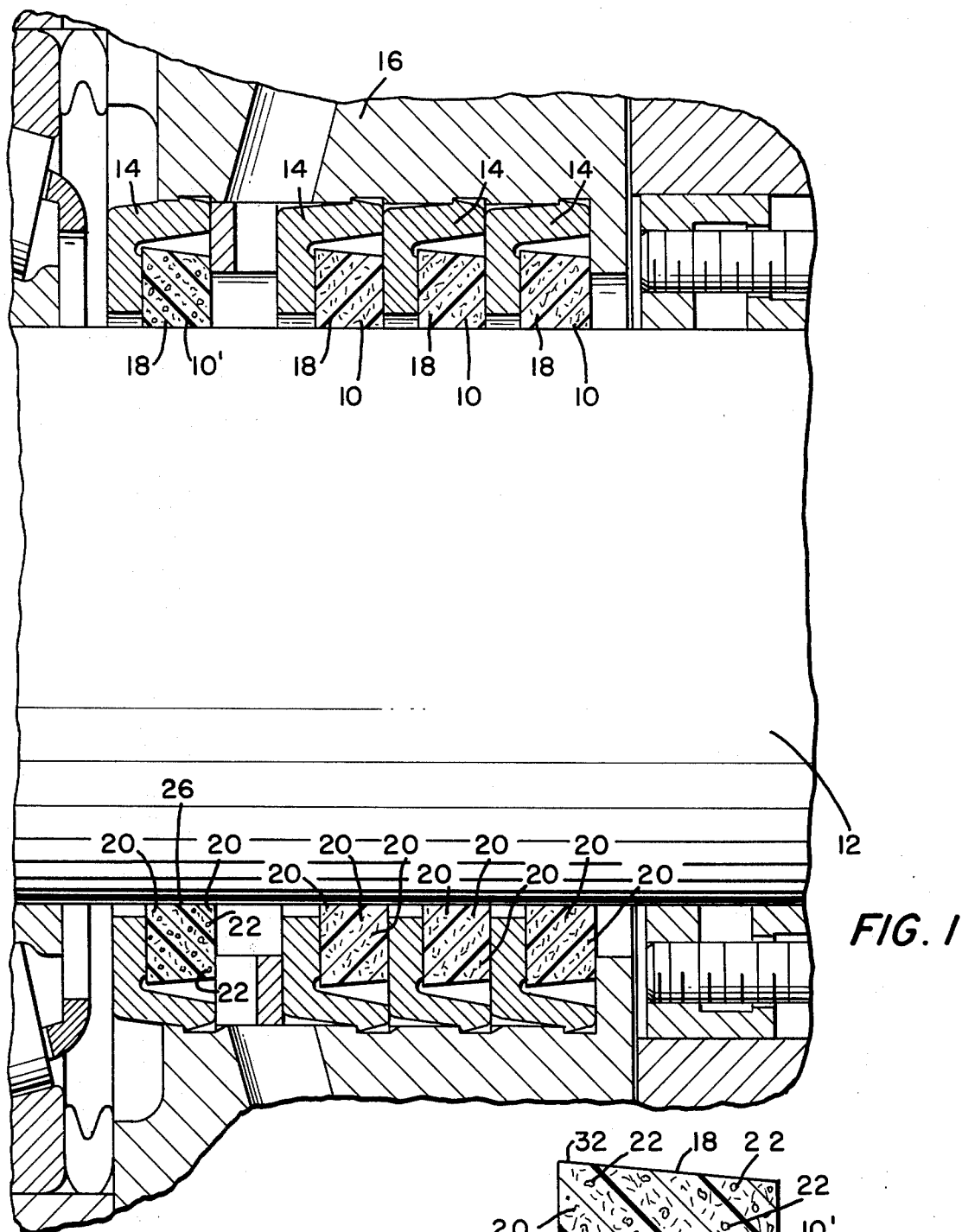

United States Patent [19]

Webb

[11] 4,050,701
[45] Sept. 27, 1977

[54] FLUID SEAL

[75] Inventor: Paul Dale Webb, Tioga, Pa.

[73] Assignee: Ingersoll-Rand Company, Woodcliff Lake, N.J.

[21] Appl. No.: 745,005

[22] Filed: Nov. 26, 1976

[51] Int. Cl.$^2$ .................. B65D 53/02; C08F 28/00
[52] U.S. Cl. ........................ 277/125; 277/DIG. 6; 260/79; 308/238
[58] Field of Search .............. 277/125, 124, 179, 230, 277/DIG. 6; 260/79, 79.1; 308/DIG. 7, DIG. 8, 238, 239

[56] References Cited

U.S. PATENT DOCUMENTS

| 2,998,397 | 8/1961 | Riesing | 277/DIG. 6 |
|---|---|---|---|
| 3,324,087 | 6/1967 | Smith et al. | 260/79 X |
| 3,395,132 | 7/1968 | Smith | 260/79 X |
| 3,741,855 | 6/1973 | Harrison et al. | 308/238 X |
| 3,776,612 | 12/1973 | Barlow | 308/238 |
| 3,799,454 | 3/1974 | Blackwell | 260/79.1 X |
| 3,870,589 | 3/1975 | Shobert | 308/238 X |
| 3,873,168 | 3/1975 | Viola et al. | 308/238 |
| 3,909,087 | 9/1975 | Cairns | 308/238 |
| 3,932,008 | 1/1976 | McCloskey et al. | 308/238 |
| 3,954,932 | 5/1976 | Coale | 260/79 X |

OTHER PUBLICATIONS

Chemtech, Issue of Aug. 1972 (American Chemical Society), cover and pp. 481–485.

Primary Examiner—Robert S. Ward, Jr.
Attorney, Agent, or Firm—Bernard J. Murphy

[57] ABSTRACT

The novel seal comprises a non-contacting, floating ring seal formed, by injection molding, of carbon fiber-reinforced polyphenylene sulfide, for use in fluid-sealing a rotary steel shaft. The reinforced polyphenylene sulfide exhibits thermal expansion which is substantially equal to that of steel; thus a predetermined radial clearance is maintained, between the seal and the shaft without the need for a circumferential steel band, or the like, shrunk onto the seal.

3 Claims, 2 Drawing Figures

FLUID SEAL

This invention pertains to seals, and in particular to non-contacting, floating ring seals used for fluid-sealing rotary and/or reciprocating shafts.

Non-contacting, floating ring seals normally consist of a single, complete, carbon ring, sealing element that floats freely within a seal housing, and encompasses a portion of a shaft or the like. The clearance between the carbon ring and the shaft is kept as low as possible (0.254 to 0.508 mm or 0.001 to 0.002 inch diametral clearance). As the shaft temperature increases, the ring seal inside diameter must increase to maintain an optimum clearance. To make this possible, a band made of the same material as the shaft is shrunk on the ring seal O.D. so that the thermal expansion thereof will approximately equal that of the shaft. As the shaft expands, the ring expands, and the clearance remains substantially constant. However, such a seal assembly is expensive ($30 – $40).

It is an object of this invention to set forth an improved fluid seal, a seal which is relatively inexpensive, and which exhibits thermal expansion which equals or substantially equals that of steel.

Particularly, it is an object of this invention to disclose an improved fluid seal comprising a sealing element formed of carbon fiber-reinforced polyphenylene sulfide.

Figure 2:
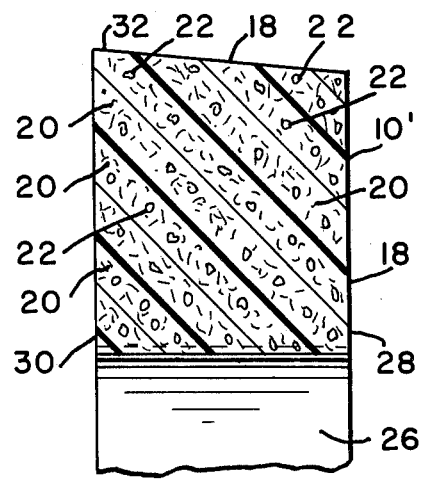

Further objects of this invention, as well as the novel features thereof, will become more apparent by reference to the following description taken in conjunction with the accompanying figures, in which:

FIG. 1 is a cross-sectional view, in elevation, illustrative of a shaft sealing arrangement employing novel fluid seals according to the invention; and FIG. 2 is an enlarged, fragmentary view, in crosssection, of one of the fluid seals of FIG. 1.

As shown in the figures, seals 10 and 10' are disposed about a rotary steel shaft 12, with a clearance of 0.0005 to 0.001 inch (0.0127 to 0.0254 mm), and held in position by means of retainers 14 which cooperate with a seal cartridge 16. The seals 10 and 10' are injection molded of carbon fiber-reinforced polyphenylene sulfide 18. The coefficient of thermal expansion of the carbon fiber-reinforced polyphenylene sulfide matches that of the shaft, i.e., 6.0 inch per inch per degree of F. (10.8 mm/mm/° C) times $10^{-6}$. Therefore, the novel seals 10 and 10' perform the same function as the prior art carbon rings with the steel bands. However, these injection molded seals are of moderate cost, approximately $3 – $4. The carbon fibers 20 comprise approximately thirty percent (30%) by weight of the seals 10 and 10' and have a mean diameter of 0.0003 inch (0.0076 mm). Said fibers 20 enhance the fatigue endurance and wear resistance of the polyphenylene sulfide 18, and insure that the polyphenylene sulfide 18 holds to the steel-like coefficient of expansion.

In use, should the seals 10 and/or 10' contact the shaft 12, it is desirable for them to have an additive which will provide for lubricity. Accordingly, my invention comprehends the incorporation of such an additive in the injection molding. Seals 10', by way of example, comprise Teflon (trade mark for polytetrafluoroethylene) particles 22 dispersed in carbon fiber-reinforced polyphenylene sulfide.

In practice the Teflon, in the form of discrete particles 22, preferably varying in size from 0.396 mm to 0.793 mm, or one-sixtyfourth to one-thirtysecond of an inch in average diameter, is mixed with the polyphenylene sulfide (and carbon fibers) in the form of a powder preferably in about the same degree of comminution, and in a quantity of approximately fifteen percent (15%) by weight. The Teflon particles 22 are made by grinding Teflon bar stock or by grinding scraps and flash of molded Teflon articles or it may be obtained in powder form from the manufacturers thereof. In this connection it is important that the Teflon be of a sintered type rather than virgin molding powder. Sintered material is denser and is by far more desirable for my intended use. Furthermore sintered Teflon is usually scrap material from mechanical operations on molded Teflon and as such is less expensive.

Sintered Teflon is the virgin molding powder that has been processed as by compression and heat in a molding process to densify the particles 22 and fuse away the horny, hook-like structure of the virgin molding powder particles. For this reason my invention is directed primarily to the use of sintered Teflon material in pulverulent form.

These sintered Teflon particles 22 are intimately mixed with the powder of the polyphenylene sulfide (and carbon fibers) and the mixture is then heated to a temperature sufficient to make the polyphenylene sulfide flowable as is well known in the art, i.e., temperatures of approximately 550° F to 675° F (approx. 228° C to 357° C). It is manifest that at these temperatures the Teflon particles 22 will not change in physical character and will remain in discrete form dispersed throughout the flowable carbon fiber-bearing polyphenylene sulfide. This flowable mixture is then injected by conventional procedures into a suitable mold and is allowed to cool whereupon a seal 10' is formed which includes a carbon fiber-reinforced polyphenylene sulfide matrix and Telfon wherein the Teflon is present in the form of dispersed discrete particles 22 bonded together and held in the matrix of a continuous phase of the reinforced polyphenylene sulfide. The seal 10' formed is shown in FIG. 2 wherein the particles 22 of Teflon in discrete form are shown while the reinforced polyphenylene sulfide binder is shown at 18; the carbon fibers are indicated by index number 20. The particles 22 and fibers 20 are shown in exaggerated sizes, only for purposes of clarification; it is to be understood that the carbon fibers 20, for instance, are substantially microscopic in actual size. In the molding operation, the bore 26 of the seal 10 is preferably molded smaller than the bore ultimately desired. This is done because the reinforced polyphenylene sulfide 18 being in a continuous phase, covers all surfaces of the discrete Teflon particles 22 and, in effect, forms a continuous surface at all portions of the seal 10'. In order to make available the highly desirable lubricative properties of the Teflon it is therefore necessary to ream the bore 26 to expose the surfaces of the Teflon particles 22 adjacent the bore. This is carried out with either a standard reamer or by machining the bore a few thousandths of an inch larger than the molded dimension. This brings the bore to a dimension designated by the dotted lines of the drawing and this surface is composed of exposed Teflon particles 22, and carbon fibers 20, surrounded by areas of the polyphenylene sulfide.

According to my teaching, then, seals — such as seal 10' (FIG. 2) — are injection molded of the Teflon particles and carbon fibers-containing polyphenylene sulfide 18, with the axial ends 28 and 30, and the outer circumference 32 left as molded. Then, the bore 26 is machined to the desired dimension.

While I have described my invention in connection with specific embodiments thereof, it is to be clearly understood that this is done only by way of example and not as a limitation to the scope of my invention as set forth in the objects thereof and in the appended claims.

I claim:
1. A fluid seal, for fluid sealing a steel shaft having a given outside diameter, comprising:
 a sealing element;
 said element being formed of a moldable polymer material having a coefficient of expansion substantially equal to the coefficient of expansion of steel; and wherein
 said element has carbon fibers and polytetrafluoroethylene particles dispersed therewithin.
2. A fluid seal, according to claim 1, wherein:
 said moldable polymer material comprises polyphenylene sulfide.
3. A fluid seal, according to claim 1, wherein:
 said element is of annular configuration, having an inside diameter of from approximately 0.0005 to 0.001 inch (0.0127 to 0.0254 mm) greater than said given diameter; and
 only said inside diameter of said element is machine-finished.